(12) United States Patent
Yamamoto

(10) Patent No.: US 8,171,822 B2
(45) Date of Patent: May 8, 2012

(54) REDUCER AND METHOD OF USE THEREOF

(75) Inventor: Akira Yamamoto, Obu (JP)

(73) Assignee: Sumitomo Heavy Industries, Ltd., Tokyo (JP)

( * ) Notice: Subject to any disclaimer, the term of this patent is extended or adjusted under 35 U.S.C. 154(b) by 989 days.

(21) Appl. No.: 12/153,141

(22) Filed: May 14, 2008

(65) Prior Publication Data

US 2008/0287243 A1    Nov. 20, 2008

(30) Foreign Application Priority Data

May 16, 2007  (JP) .................. 2007-130075

(51) Int. Cl.
- *F16H 57/02* (2012.01)
- *F16H 61/00* (2006.01)
- *F16H 57/04* (2010.01)
- *F01M 1/00* (2006.01)

(52) U.S. Cl. ............ 74/606 R; 475/159; 184/109

(58) Field of Classification Search .......... 475/159, 475/169, 170; 74/467, 606 R; 184/6.12; 137/197, 433

See application file for complete search history.

(56) References Cited

U.S. PATENT DOCUMENTS

| | | | | |
|---|---|---|---|---|
| 2,170,951 A | * | 8/1939 | Perry | 475/178 |
| 4,351,203 A | * | 9/1982 | Fukunaga | 74/606 R |
| 4,595,118 A | * | 6/1986 | Azuma et al. | 220/203.27 |
| 4,909,102 A | * | 3/1990 | Haga | 475/168 |
| 4,970,913 A | * | 11/1990 | Kielar et al. | 74/606 R |
| 5,129,422 A | * | 7/1992 | Davison et al. | 137/599.09 |
| 6,029,696 A | * | 2/2000 | Heatwole | 137/587 |
| 7,390,277 B2 | * | 6/2008 | Egawa | 475/159 |
| 7,597,114 B2 | * | 10/2009 | Buckingham et al. | 137/433 |
| 7,604,020 B2 | * | 10/2009 | Kennedy | 137/197 |
| 2003/0010151 A1 | * | 1/2003 | Johnson et al. | 74/606 R |
| 2006/0025271 A1 | | 2/2006 | Egawa | |
| 2007/0042704 A1 | | 2/2007 | Qualy et al. | |

FOREIGN PATENT DOCUMENTS

| | | |
|---|---|---|
| DE | 3923530 A1 | 1/1990 |
| DE | 10122993 A1 | 12/2002 |
| DE | 10349543 B3 * | 11/2004 |
| DE | 102004046844 A1 | 10/2005 |
| JP | 08-200034 A | 8/1996 |
| JP | 10-068460 A | 3/1998 |
| JP | 2002-295646 A | 10/2002 |
| JP | 2006-038108 A | 2/2006 |
| KR | 2003-0056404 A | 7/2003 |
| KR | 10-2006-0067532 A | 6/2006 |
| WO | 92/15382 A2 | 9/1992 |
| WO | WO 2007093235 A1 * | 8/2007 |

OTHER PUBLICATIONS

Machine translation of DE10122993 done Sep. 20, 2011.*
Machine translation of DE102004046844 done Sep. 20, 2011.*
Japanese Office Action application No. 2007-130075 dated Oct. 19, 2010.

* cited by examiner

*Primary Examiner* — Tisha Lewis

(74) *Attorney, Agent, or Firm* — Squire Sanders (US) LLP

(57) ABSTRACT

The reducer contains a lubricant inside, which is at least partly flowable during the operation, the inside of the reducer being tightly sealed from the outside. The reducer includes a communicating part that communicates the inside and the outside of the reducer. The communicating part is blocked with a blocking member that has oil repellency, air permeability, and non-permeability to oil.

9 Claims, 2 Drawing Sheets

REDUCER AND METHOD OF USE THEREOF

BACKGROUND OF THE INVENTION

1. Field of the Invention

The present invention relates to the technical field of reducers, which transmit drive power from an input shaft to an output shaft at a reduced rate.

2. Description of the Related Art

Conventionally, reducers contain a lubricant such as a grease inside for friction reduction and for cooling purposes (see Japanese Patent Application Laid-Open No. 2006-38108).

A grease or an oil is used as the lubricant. It is generally known that an oil is better than a grease in the friction reduction and cooling performances.

Making various parts (gears etc.) constituting the reducer can achieve a goal to make the reducer compact, but it also results in a smaller output capacity of the reducer. There is, therefore, another approach to make the reducer more compact, not by making the components smaller but by making the internal space of the reducer (where a lubricant is contained) smaller, so that the output power of the reducer is maintained (or increased).

To keep high output power of the reducer, oil lubrication is more advantageous than grease lubrication. On the other hand, if the reducer is designed to have a smaller internal space to make the reducer more compact, the pressure inside easily rises during the operation of the reducer and a lubricant contained inside more easily leaks out. This is presumably because a smaller internal space provides a smaller buffer space for accommodating the pressure buildup.

To prevent such a pressure buildup, for example, an "air release hole" provided to the reducer would suffice. However, the reducer may not necessarily be used always in the same orientation during the operation. A mere "air release hole" would let oil leak out if the orientation is changed during the operation.

SUMMARY OF THE INVENTION

In view of the foregoing problems, various exemplary embodiments of this invention provide a reducer that can prevent both oil leakage and internal pressure buildup.

To achieve the above object, the present invention provides a reducer having a tight seal between the inside and outside of the reducer and containing a lubricant inside, the lubricant being at least partly flowable during operation of the reducer. The reducer includes a communicating part that communicates the inside and outside of the reducer, and this communicating part is blocked by a blocking member that has oil repellency, air permeability, and non-permeability to oil. Such a structure, when adopted for the reducer, can suppress a possible pressure buildup inside the reducer during use, so that the blocking member having "air permeability" would let air go out of the reducer. The blocking member has "non-permeability to oil" so that the gear oil does not leak out of the reducer. Furthermore, the blocking member also has "oil repellency" so that the blocking member repels and removes the gear oil immediately that may attach to the blocking member, and prevents any gear oil film from reducing the "air permeation" of the blocking member. That is, the reducer can be used without any risk of leaking the gear oil even if the reducer is used in various changing orientations during the operation.

Note, throughout the description and the claims, the words "oil repellency" mean a characteristic of repelling an oil such as a gear oil. The words "air permeability" mean a characteristic of letting air pass through. The words "non-permeability to oil" mean a characteristic of not letting an oil permeate (pass through).

The invention, when applied to a reducer, provides effects of preventing both oil leakage and internal pressure buildup, contributing to size reduction and power increase of the reducer.

DETAILED DESCRIPTION OF THE PREFERRED EMBODIMENTS

One preferred exemplary embodiment of the present invention will be hereinafter described in detail with reference to the accompanying drawings.

Figure 1:
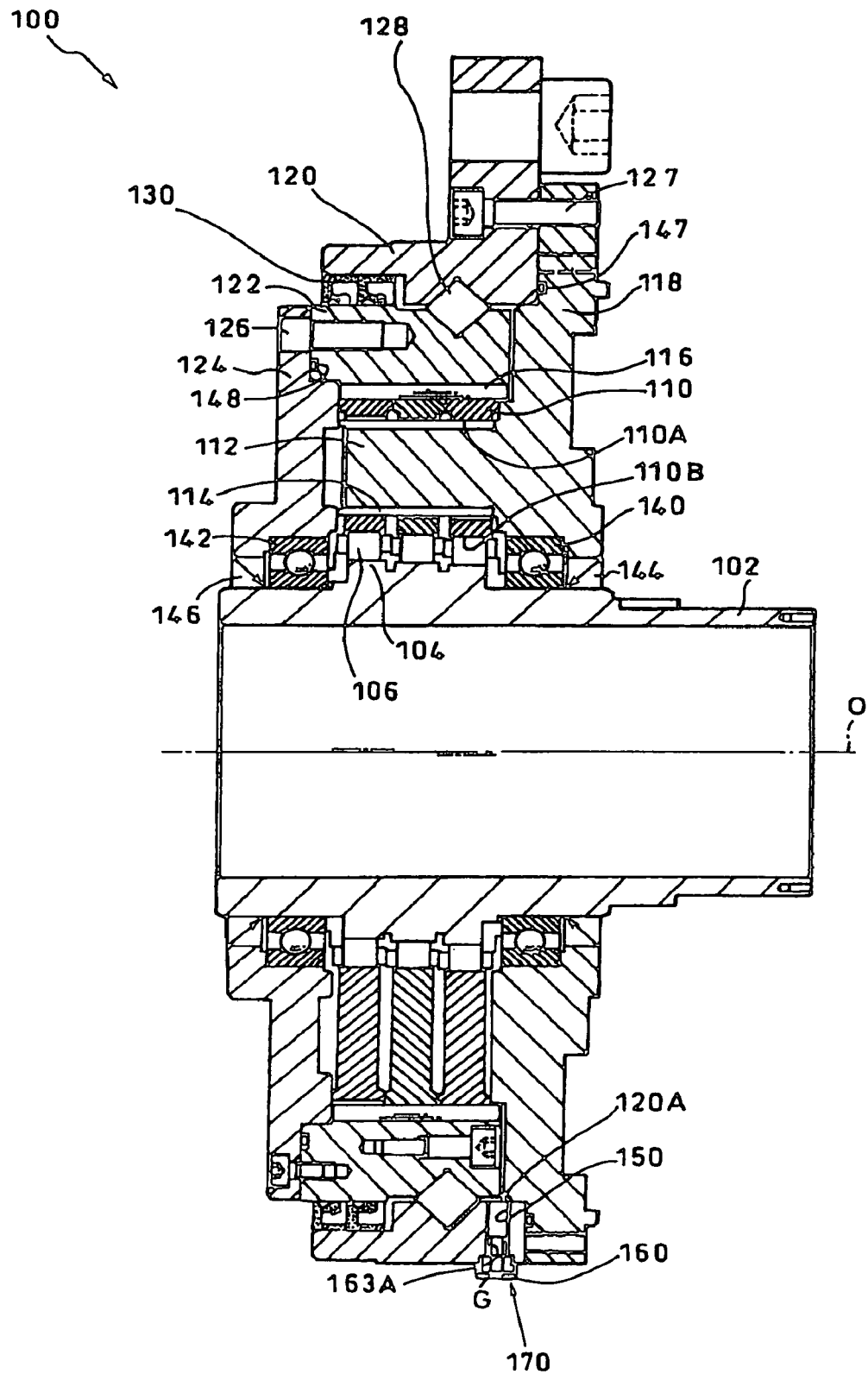
FIG. 1 is a cross-sectional side view of a reducer 100 according to one exemplary embodiment of the present invention.
Figure 2:
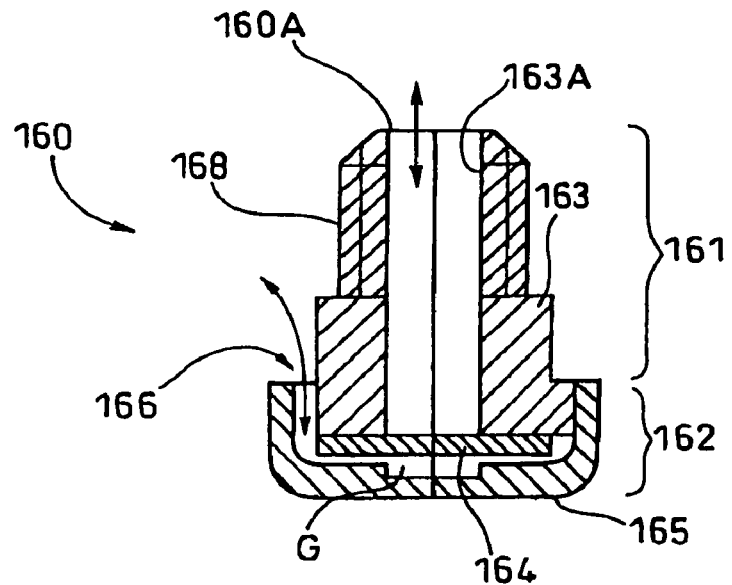
FIG. 2 is an enlarged view of a plug 160 used in the reducer 100.

FIG. 1 is a cross-sectional side view of a reducer 100 according to one exemplary embodiment of the present invention. FIG. 2 is an enlarged view of a plug 160 used in the reducer 100.

(Structure of the Reducer 100)

The reducer 100 is a machine for reducing the speed of drive power (torque) input to an input shaft 102 and for transmitting the power to a target machine (not shown) at the reduced speed. Eccentric bodies 104 are integrally formed to the input shaft 102 that is rotatable around an axis O. In the present exemplary embodiment, there are three eccentric bodies 104, which are shifted from each other by a 120° phase difference. Each of these eccentric bodies 104 makes contact with an external gear 110 via an eccentric body bearing 106. The external gear 110 makes contact with the eccentric body bearing 106 in its center hole 110B, and engages with outer pins 116. The external gear 110 includes a plurality of inner pin holes 110A (although only one of the inner pin holes is shown in the drawing). Inner pins 112 loosely fit in these inner pin holes 110A via inner rollers 114. The inner pins 112 are integrally formed with a disc-like first flange 118. The first flange 118 is supported with a first bearing 140 so as to rotate relative to the input shaft 102. A second bearing 142 is disposed on the input shaft 102 at a position axially opposite to the first bearing 140, the external gears 110 being therebetween. The second bearing 142 supports the input shaft 102 and a disc-like second flange 124 rotatably relative to each other. The second flange 124 is securely coupled to a frame body 122 with bolts 126 so that the second flange 124 and the frame body 122 rotate together. The outer pins 116 mentioned above are set on the inner circumferential surface of the frame body 122. Although not shown in the drawing, there is a small difference (one to three) between a number of teeth of the external gear 110 and a number of outer pins 116.

A casing 120 that covers the frame body 122 is fixedly coupled to the radially outermost end of the first flange 118 with bolts 127. The casing 120 and the frame body 122 mentioned above are supported such as to be rotatable relative to each other by means of a cross roller bearing 128. In other words, from a viewpoint that takes the cross roller bearing 128 as the center of the structure, the casing 120 functions as an outer ring of the cross roller bearing 128 and the frame body 122 as an inner ring thereof.

A seal member 130 is press-fitted between the frame body 122 and the casing 120. Furthermore, a seal member 144 is arranged between the first flange 118 and the input shaft 102, on the outer side (right side in FIG. 1) of the first bearing 140. A seal member 146 is also arranged between the second flange 124 and the input shaft 102, on the outer side (left side in FIG. 1) of the second bearing 142. Furthermore, O-rings 147 and 148 are provided at portions where the first flange 118 and the casing 120 are coupled to each other, and where the second flange 124 and the frame body 122 are coupled to each other. These seal members 130, 144, 146 and O-rings 147 and 148 provide a tight seal between the inside and outside of the reducer 100.

The casing 120 is provided with a through hole 150 that communicates the inside and outside of the reducer 100. A plug (engaging member) 160 is set in this through hole 150 (the plug will be described in more detail later).

The reducer 100 contains a gear oil as a lubricant inside (not shown). The lubricant contained inside can be any type of lubricant as long as it is at least partly flowable during the operation of the reducer 100, and is not limited to lubricants that are in a liquid form at normal temperature.

(Plug Structure)

Next, the structure of the plug 160 will be described with reference to FIG. 2.

The plug (engaging part) 160 consists of an inserted part 161 and a non-inserted part 162. When attached, the inserted part 161 fits in the through hole 150 provided in the casing 120. The inserted part 161 may include, for example, screw threads 168, in which case the through hole 150 is also provided with screw threads, so that the plug is attached by screw engagement. The plug 160 includes a main body 163 and a cover 165 connected to this main body 163. The main body 163 and the cover 165 are coupled to each other with a partial gap G between them. The main body 163 has a center bore (hollow part) 163A that communicates with the gap G. Accordingly, when the plug 160 is attached to the through hole 150 of the casing 120, the through hole 150, the center bore 163A, and the gap G constitute the "communicating part 170 that communicates the inside and outside of the reducer". A sheet-like blocking member 164 is arranged such as to block the communication between the center bore 163A and the gap G (to block the communicating part 170). The blocking member 164 is made of a material that has oil repellency, air permeability, and non-permeability to oil. More specifically, the material is a lamination of polytetrafluoroethylene (PTFE) porous film and polyester non-woven cloth, with the PTFE porous film facing the inside of the reducer. This blocking member 164 allows air to go in and out from an inlet/outlet port 166 through the center bore 163A and the gap G. On the other hand, the gear oil is blocked by the blocking member 164 and does not leak out through the gap G towards the inlet/outlet port 166.

Figure 3:
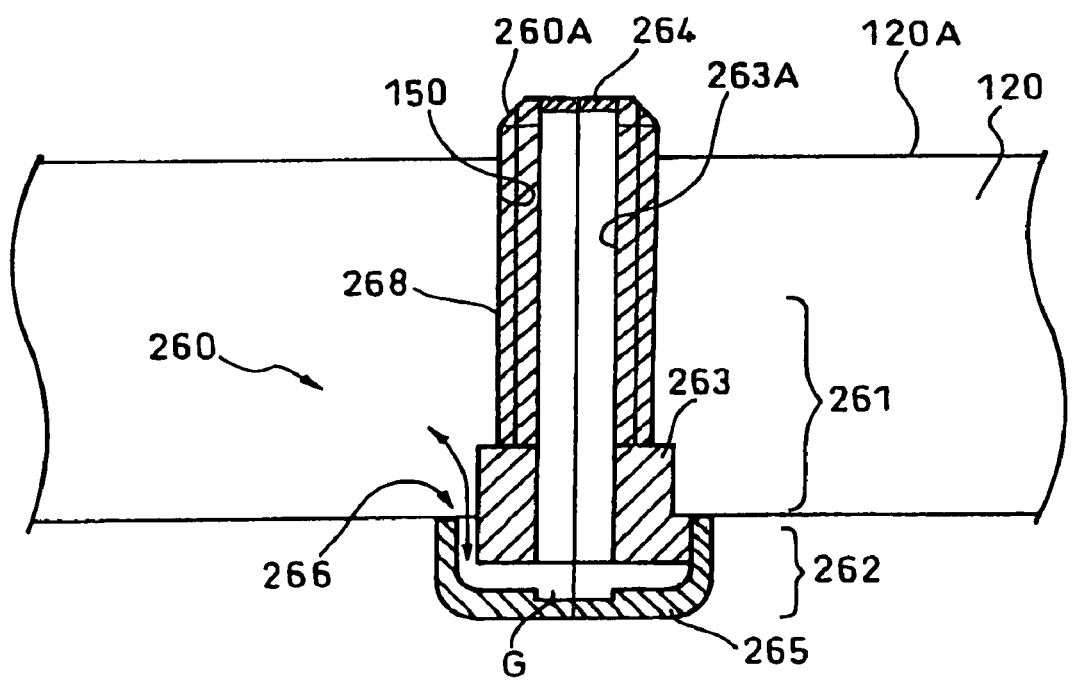
FIG. 3 is a view illustrating another exemplary embodiment of the plug.

In the present exemplary embodiment, when the plug 160 is engaged in the through hole 150, the inner-side end face 160A of the plug 160 is positioned in the midway in the through hole 150 (see FIG. 1). In an alternative structure, as shown in FIG. 3, part of the plug 260 (protruded part 260A) may extend through the through hole 150, protruding further inwards from the inner-side end face 120A of the through hole 150. In such a structure, the blocking member 264 can be arranged to the protruded portion 260A. In other words, the communicating part may be constructed of the plug 260 engaging into the through hole 150 formed in the casing 120 of the reducer and having a hollow part 263A. The plug 260 protrudes further inwards from the inner-side end face 120A of the through hole 150, so that the blocking member 264 can be arranged to the protruded portion 260A. As a result, the lubricant that flows during the operation can more easily make contact with the blocking member 264. Therefore, even if abrasion powder or the like may have adhered to the surface of the blocking member 264, this can be washed away by the lubricant, so that it is ensured that the blocking member 264 can exhibit its oil repellency and air permeability.

The above-described reducer 100 is formed with one set of the communicating part and the blocking member. This is not a requirement, and another structure with two or more communicating parts and blocking members may be adopted. For example, the set of the communicating part and blocking member may be provided respectively at both sides of a reference plane, the reference plane including both axial centers of the input and output shafts of the reducer, in the case where the input shaft 102 is coaxial with the output shaft (second flange 124) as in the case with the reducer 100. Or, in the case where the output shaft and the input shaft of the reducer are not coaxial with each other (for example, a right angle reducer or a parallel reducer), the reference plane may be a plane that includes the axial center of one shaft and is parallel to the axial center of the other shaft, or a plane that is parallel to the axial centers of both shafts. If the communicating parts and the blocking members each are arranged vertically away from the reference plane, at least one of the communicating parts can always communicate with the outside irrespective of the orientation of the reducer. (That is, the blocking member in at least one communicating part will always be not in contact with the lubricant.) This does not impose any limitation that the communicating part and blocking member should be positioned in the vertical direction; they may be arranged at any suitable position in accordance with the type of the reducer or the situation in which the reducer is used. As long as the communicating part and blocking member are provided at both sides of the reference plane mentioned above, three or more communicating parts and blocking members may be provided.

(Operation of the Reducer 100)

Next, the operation of this reducer 100 will be described. When power (torque) is transmitted to the input shaft 102 from a power source (not shown), the eccentric bodies 104 integrally formed on the input shaft 102 start eccentric rotations. The eccentric rotations of the eccentric bodies 104 are transmitted to the external gear 110 through the eccentric body bearing 106. That is, the external gear 110 starts rotating around the axis O, with an oscillating rotation. The engagement between the external gear 110 and the outer pins 116 restricts the rotation, making the external gear 110 undergo almost only the oscillating motion. The small difference between the number of teeth of the external gear 110 and the number of the outer pins 116 makes the external gear 110 rotate on its own axis relative to the outer pins 116 corresponding to this difference in the number of teeth, for each oscillating rotation of the external gear 110. The rotational component of the external gear 110 on its own axis (relative rotational component) relative to the outer pins 116 is transmitted to the first flange 118 via the inner pins 112 and the inner rollers 114. The oscillating component of the external gear 110 is absorbed by the loose fit between the external gear 110 and the inner pins 112 and the inner rollers 114. Therefore, only the rotational component (relative rotational component) is transmitted.

As a result, the casing 120 fixedly coupled to the first flange 180 rotates relative to the frame body 122 in which the outer pins 116 are arranged. This relative rotation is achieved smoothly through the cross roller bearing 128.

In the present exemplary embodiment, since the second flange 124 is stationary, the rotation of the input shaft 102 is output as the rotation of the first flange 118 at a reduced rate. When the first flange 118 is stationary, the rotation of the input shaft 102 is output as the rotation of the second flange 124 at a reduced rate.

In the present exemplary embodiment, the communicating part that communicates the inside and outside of the reducer 100 is made up of the through hole 150 provided in the casing 120 and the plug 160 set in this through hole 150. Consequently, even if the pressure inside the reducer rises by the use of the reducer 100, the pressure is stopped from rising too much, because air is brought out of the reducer 100 through the blocking member 164 having air permeability. Since the blocking member 164 also has non-permeability to oil, blocking member 164 prevents the gear oil from leaking out of the reducer 100. Furthermore, since the blocking member 164 also has oil repellency, blocking member 164 repels and removes the gear oil immediately that may attach to the blocking member 164, and prevents any gear oil film from reducing the air permeation of the blocking member 164. That is, even if the reducer 100 is used in various changing orientations during the operation, the reducer can be used with the internal pressure being controlled and without any leakage of gear oil contained inside.

In the present exemplary embodiment, the blocking member has oil repellency, air permeability, and non-permeability to oil to be just for blocking the communicating part 170. From a different point of view, however, the technical significance of the present invention will be more apparent if the reducer is used so as to actively change its orientation during the operation. By actively changing the orientation of the reducer, the gear oil continually touches and moves away from the blocking member 164 repeatedly. If the gear oil were constantly in contact with the blocking member 164 (the blocking member 164 being immersed in the gear oil), it is difficult for the blocking member 164 to exhibit its air permeability. However, if the orientation of the reducer is changed so that the gear oil continually touches and moves away from the blocking member 164 repeatedly, the oil repellency of the blocking member 164 can ensure the air permeability, enabling prevention of the pressure buildup as well as the oil leakage. For example, the effect is particularly clear if the reducer is mounted in an industrial robot's arm portion or the like for driving the joint of the robot.

While the reducer described above is an oscillating internally meshing planetary gear reducer, it is only one example and the invention is not limited to this type of the reducer. Whether the reducer is an oscillating type or not, or whether it is a planetary gear or not, the invention can be applied to a wide range of reducers.

The plug 160 is simply one exemplary embodiment of the invention that includes the blocking member 164. It need not be a "plug" as in the present exemplary embodiment and various other designs are possible, as long as the communicating part can be blocked by a blocking member.

The reducer is particularly suitable for use in driving devices or machines which will not stay in one orientation during the operation, such as industrial robots, electric tools, construction machines, ship and vessel, automobiles, and airplanes.

The disclosure of Japanese Patent Application No. 2007-130075 filed May 16, 2007 including specification, drawing and claim are incorporated herein by reference in its entirety.

What is claimed is:

1. A reducer comprising:
a casing enabling a tight seal between an inside and an outside of the reducer;
a lubricant contained in the casing, the lubricant being at least partly flowable during operation of the reducer;
a communicating part formed in the casing or in a component integrally formed with the casing, for communicating the inside and the outside of the reducer; and
a blocking member arranged in the communicating part for blocking the communicating part, wherein the blocking member comprises a sheet member having oil repellency, air permeability, and non-permeability to oil, wherein:
the communicating part comprises an engaging member having a hollow part and set in a through hole provided in the casing of the reducer;
the engaging member protrudes further inwards from an inner-side end face of the through hole to have a protruded portion; and
the blocking member is arranged at the protruded portion.

2. The reducer according to claim 1, wherein the communicating part and the blocking member are provided at least, respectively, at both sides of a plane, wherein the plane includes both axial centers of an output shaft and an input shaft of the reducer, where the input shaft is coaxial with the output shaft.

3. A method of producing a reducer, comprising:
configuring a casing enabling a tight seal between an inside and an outside of the reducer;
containing a lubricant in the casing, the lubricant being at least partly flowable during operation of the reducer;
forming a communicating part in the casing or in a component integrally formed with the casing, to communicate the inside and the outside of the reducer; and
configuring a blocking member in the communicating part to block the communicating part, wherein the blocking member comprises a sheet member having oil repellency, air permeability, and non-permeability to oil,
wherein an orientation of the reducer is changed constantly during operation so that the lubricant continually touches and moves away from the blocking member repeatedly,
wherein the communicating part comprises an engaging member having a hollow part and set in a through hole provided in the casing,
the engaging member protrudes further inwards from an inner-side end face of the through hole to have a protruded portion, and
the blocking member is arranged at the protruded portion.

4. The method according to claim 3, further comprising:
using the reducer to drive a joint of an industrial robot.

5. The reducer according to claim 1, wherein the communicating part and the blocking member are provided at least, respectively, at both sides of a plane, wherein the plane includes the axial center of one of the output shaft and the input shaft and is parallel to the axial center of the other one of the output shaft and input shaft.

6. The reducer according to claim 1, wherein the communicating part and the blocking member are provided at least, respectively, at both sides of a plane, wherein the plane is parallel to both axial centers of the output shaft and the input shaft.

7. The reducer according to claim 1, wherein an orientation of the reducer is changed constantly during operation so that the lubricant continually touches and moves away from the blocking member repeatedly.

8. The reducer according to claim 1, wherein the reducer is used for driving a joint of an industrial robot.

9. The reducer according to claim 1, wherein:
the communicating part comprises an engaging member having a hollow part and set in a through hole provided in the casing of the reducer; and
the blocking member is arranged so as to block the hollow part.

* * * * *